United States Patent [19]
Lee et al.

[11] Patent Number: 5,298,826
[45] Date of Patent: Mar. 29, 1994

[54] ROTOR FOR ROTARY ELECTRICAL MACHINERY

[75] Inventors: Takanobu Lee; Ikuo Matsushita; Masao Take; Masahiro Mifune, all of Matsudo, Japan

[73] Assignee: Mabuchi Motor Co., Ltd., Chiba, Japan

[21] Appl. No.: 979,286

[22] Filed: Nov. 20, 1992

[30] Foreign Application Priority Data

Nov. 21, 1991 [JP] Japan .................. 3-095299[U]

[51] Int. Cl.$^5$ .................................................. H02K 21/12
[52] U.S. Cl. ...................................... 310/156; 310/42; 310/43; 310/44
[58] Field of Search .............. 310/156, 43, 153, 261, 310/42, 44, 91; 29/598

[56] References Cited

U.S. PATENT DOCUMENTS

| | | | |
|---|---|---|---|
| 2,680,822 | 6/1954 | Brainard | 310/156 |
| 2,985,779 | 5/1961 | Flaningam | 310/156 |
| 3,164,735 | 1/1965 | Lichowsky | 310/156 |
| 4,674,178 | 6/1987 | Patel | 29/598 |
| 4,748,359 | 5/1988 | Yahara | 310/156 |
| 4,906,882 | 3/1990 | Erndt | 310/156 |

FOREIGN PATENT DOCUMENTS 0117567  9/1981  Japan ................... 310/156

Primary Examiner—R. Skudy
Attorney, Agent, or Firm—McGlew and Tuttle

[57] ABSTRACT

A rotor for rotary electrical machinery comprising a permanent-magnet member made of a mixture having ferromagnetic material powder and a binder resin for chief ingredients, and a shaft, in which a recess whose projected contour on a plane orthogonally intersecting the axial line of the permanent-magnet member is of a non-circular shape is provided at least an end face of the permanent-magnet member, and a shaft is press-fit into a metallic bush fitted to the recess, thereby ensuring high coaxiality tolerance between the permanent-magnet member and the shaft, easy assembly and low manufacturing cost.

7 Claims, 3 Drawing Sheets

F I G. 5
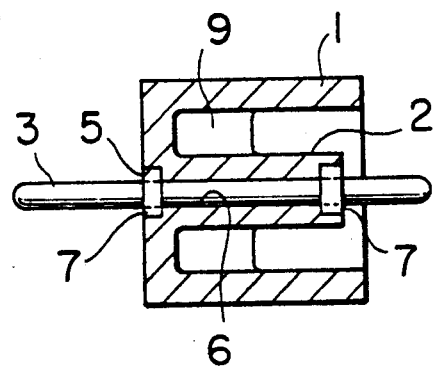
F I G. 6
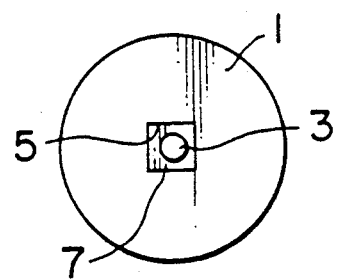
F I G. 7
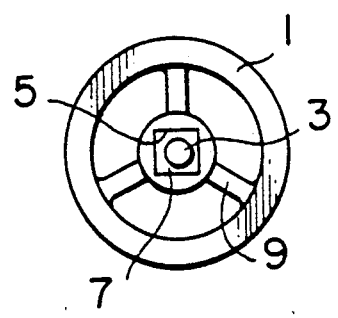

ROTOR FOR ROTARY ELECTRICAL MACHINERY

BACKGROUND OF THE INVENTION

This invention relates generally to a rotor for rotary electrical machinery, including stepping motors, and more particularly to a rotor for rotary electrical machinery using as a constituent element a so-called bonded magnet made of a mixture having ferromagnetic material powder and a binder resin for chief ingredients.

DESCRIPTION OF THE PRIOR ART

Conventional rotors for rotary electrical machinery using as a constituent element a bonded magnet are usually of a construction shown in FIGS. 1 and 2. FIG. 1 is a perspective view, and FIG. 2 is a longitudinal sectional view of a conventional type of rotor for rotary electrical machinery. In FIGS. 1 and 2, numeral 1 indicates a permanent-magnet member formed of a mixture of ferrite powder and a binding resin into a bottomed hollow cylindrical shape. Numeral 2 indicates a boss to which a shaft 3 is concentrically fixed. On the outer circumferential surface of the permanent-magnet member 1 provided are a plurality of magnetic poles (not shown) extending axially. By rotatably supporting the rotor in a stator on which a wire is wound, an electric motor or generator is formed.

An efficient means for forming a rotor of the aforementioned construction is molding the permanent-magnet member 1 and the shaft 3 integrally by injection molding. That is, a shaft 3 is placed at a predetermined location in a molding metal die, and a mixture of ferrite powder and a binder resin is charged into the mold to integrally mold the shaft 3 with the boss 2. In this process, it is generally practiced that a criss-cross or axially parallel knurling pattern is provided in advance on the outer periphery of the shaft 3 where the shaft 3 is integrally molded with the boss 2, or so-called D-cutting (the cross-section of the shaft is machined into a D shape) is performed, that is, a flat part 4 is provided on part of the outer circumferential surface of the shaft 3, to ensure a firm grip, or prevent the slipping, axial displacement or falling-off of the shaft 3 due to the difference in thermal expansion coefficients of the binder resin and the shaft 3 after molding.

By manufacturing a rotor in the aforementioned way, the unwanted slipping, axial displacement or falling-off of the shaft 3 can be prevented, but the conventional construction of rotors for rotary electrical machinery has the following problems.

The shaft 3 and the permanent-magnet member 1 should preferably be perfectly coaxial, and axial misalignment, if any, should be reduced to the minimum. Too large an axial misalignment between the shaft 3 and the permanent-magnet member 1 would make the gap between the rotor and the stator uneven, leading to the deteriorated performance of the rotary electrical machinery. In practice, however, it is extremely difficult to completely eliminate the aforementioned axial misalignment, that is, to obtain perfect coaxiality.

To mold the permanent-magnet member 1 and the shaft 3 integrally by injection molding, as shown in FIGS. 1 and 2, the shaft 3 must be placed in advance in a molding metal mold. In doing so, a certain gap is needed between a shaft insert hole and the shaft 3 in the metal mold, and this gap cannot be eliminated.

When the shaft 3 is placed in the molding metal mold, therefore, the shaft 3 can deviate to any one direction in the inside surface of the shaft insert hole, or held in an inclined state with respect to the predetermined axial line. Even when the shaft 3 is perfectly aligned with the axial line, as a compound forming the permanent-magnet member 1 is injected or poured into the molding metal mold, the shaft 3 can be deviated or inclined from the predetermined axial line by the pressure of the compound.

When the gap between the shaft insert hole and shaft 3 in the molding metal mold is made extremely small to prevent the misalignment or inclination of the shaft 3, it becomes troublesome to place the shaft 3 in the molding metal mold, and extract moldings from the molding metal mold. This reduces molding efficiency substantially.

Furthermore, if specifications of the shaft 3 is changed, the molding metal mold must be replaced with a new one even when the permanent-magnet member 1 is the same in shape and in size. This results in increased mold manufacturing cost, and requires additional work for mold replacement. This lowers the ratio of the molding of the rotor proper to the entire molding work, including tooling, leading to increased cost. The aforementioned machining, such as knurling, is needed to prevent the shaft 3 from slipping, displacement and falling, increasing machining cost. In addition, the need for using soft materials to make this machining easy inevitably reduces mechanical strength.

SUMMARY OF THE INVENTION

This invention is intended to overcome the problems inherent to the prior art described above. It is an object of this invention to provide a rotor for rotary electrical machinery that can accomplish high coaxiality between the permanentmagnet member and the shaft, good workability and low manufacturing cost.

BRIEF DESCRIPTION OF THE DRAWINGS

FIGS. 5 through 7 are a longitudinal sectional view, left-side view and right-side view of another embodiment of this invention.

DETAILED DESCRIPTION OF THE EMBODIMENTS

Figure 1:
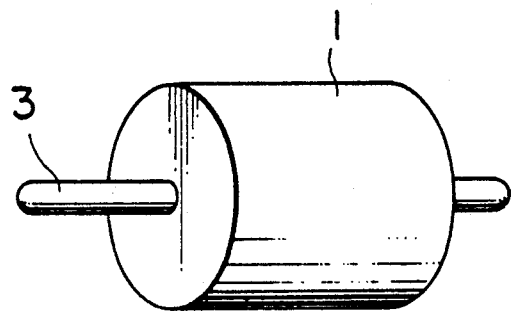
FIGS. 1 and 2 are a perspective view and a longitudinal sectional view illustrating the essential part of a conventional rotor for rotary electrical machinery.
Figure 2:
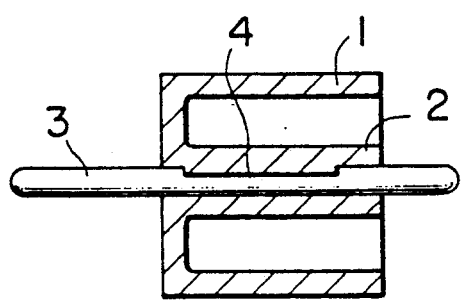
Figure 3:
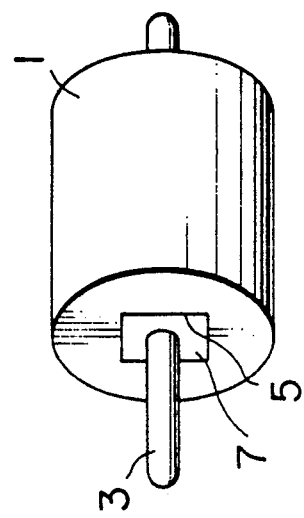
FIG. 3 is a perspective view illustrating the essential part of an embodiment of this invention.
Figure 4:
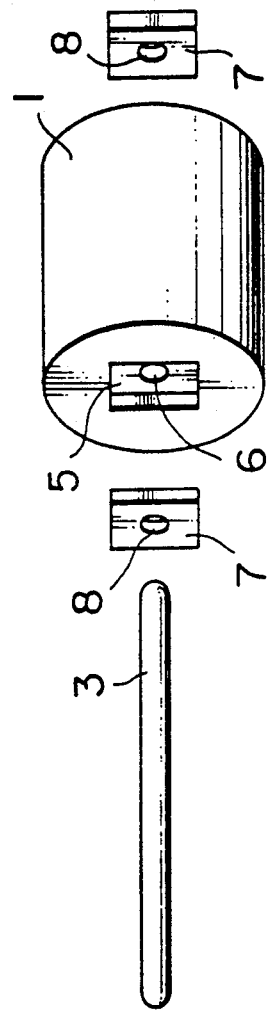
FIG. 4 is an exploded perspective view showing components of an embodiment of this invention shown in FIG. 3.

FIG. 3 is a perspective view illustrating the essential part of an embodiment of this invention, and FIG. 4 is an exploded perspective view showing components of an embodiment of this invention shown in FIG. 3. Like parts are indicated by like numerals shown in FIGS. 1 and 2. In FIGS. 3 and 4, numeral 5 refers to recesses provided coaxially on both end faces of the permanent-magnet member 1. The recesses 5 are formed into a square shape in the projected contour on a plane orthogonally intersecting the axial line of the permanent-magnet member 1. Numeral 6 refers to a through-hole formed coaxially with the permanent-magnet member 1 into an inside diameter slightly larger than the outside diameter of the shaft 3, or an inside diameter having a certain press-fit allowance. The permanent-magnet member 1 of this type can be formed by injection molding, for example.

Numeral 7 refers to a metallic bush made of sheet metal, for example, and formed by pressing or punching means into a square shape in outside contour, and the size of the metallic bush 7 corresponds to the recess 5, with a hole 8 coaxially provided at the center thereof. The inside diameter of the hole 8 is made slightly smaller than the outside diameter of the shaft 3 so that resistance to falling of the shaft 3, when press-fitted, as will be described later, can be maintained at over 20 kgf, for example. The shaft 3 is formed into a substantially equal outside diameter along the overall length.

With the aforementioned construction, the rotor is assembled by press-fitting the metallic bushes 7 into the recesses 5 on both end faces of the permanent-magnet member 1, then press-fitting the shaft 3 into the hole 8. Since the outside contour of the metallic bushes 7 is formed in such a fashion as to correspond to that of the recess 5, coaxiality between the permanent-magnet member 1 and the hole 8 can be maintained by press-fitting the shaft 3 into the recess 5. As the shaft 3 and the hole 8 are fixedly fitted to each other by press-fitting, the slipping, axial misalignment or falling of the shaft 3 can be prevented.

FIG. 5 is a longitudinal sectional view illustrating the essential part of another embodiment of this invention, FIG. 6 is a left-side view of the same, and FIG. 7 a right-side view of the same. Like parts are indicated by like reference numerals shown in FIGS. 1, 2, 3 and 4. In FIGS. 5 through 7, the permanent-magnet member 1 is formed into a bottomed hollow cylindrical shape and has ribs 9 therein. The construction of this embodiment is the same as the embodiment shown in FIGS. 3 and 4, except that the recesses 5 are provided on the bottom end face of the permanent-magnet member 1 and on the end face of the boss 2. Consequently, the method of assembly, the maintenance of coaxiality between the permanent-magnet member 1 and the shaft 3, and prevention of the slipping, axial misalignment or falling of the shaft 3 are also the same as in the embodiment shown in FIGS. 3 and 4.

In this embodiment, description has been made about the use of ferrite powder as the most commonly used materials for the permanent-magnet material. Needless to say, known ferromagnetic materials other than ferrite, such as Sm-Co or Nd-Fe-B and other rare-earth magnet materials having excellent magnetic properties may be used as ferromagnetic material powder. Furthermore, known resin materials, such as nylon, may be used as the binder resin. Injection molding has been described in this embodiment as the means for molding so-called bonded magnets, but other molding means may be used. This invention may be applied to anisotropic bonded magnets manufactured in a magnetic field. The metallic bush and the recess may be provided at least an end face of the permanent-magnet member, and the shape of them may not be limited to a square shape, but rectangular, triangular, polygonal, elliptical and other geometric shapes other than a non-circular shape can be used so long as the slipping of the shaft can be prevented.

This invention having the aforementioned construction and operation can accomplish the following effects.

(1) Since the permanent-magnet member can be molded separately, molding efficiency can be increased and the coaxiality of the permanent-magnet member with respect to the shaft can be improved substantially.

(2) Molding metal molds need not be changed even for different lengths of the shaft. This can substantially improve productivity in the short production run system in which a small quantity of a wide variety of products are manufactured.

(3) The shaft can be formed into an equal diameter, and the knurling or D-cutting of the shaft as practiced in the prior art is eliminated. This leads to reduced machining cost.

(4) Since no additional machining of the shaft is needed, the material of the shaft can be selected freely, and even high-strength materials can be used.

(5) The shaft can be fixedly fitted to the permanent-magnet material by press-fitting the shaft into the non-circular metallic bush. The slipping, axial displacement or falling of the shaft can be prevented.

What is claimed is:

1. A rotor for rotary electrical machinery, comprising:
   a permanent-magnet member of a cylindrical shape, said permanent-magnet member being formed of magnetic material powder and a binder resin as primary ingredients, said permanent-magnet member having a central axis and having a recess with a projected contour on a plane of said permanent-magnet member, said plane orthogonally intersecting said central axis of said permanent-magnet member, said recess having an outer contour which is non-circular in shape, said recess being provided on at least one end face of said permanent-magnet member;
   a metallic bush with a central hole passing therethrough, said metallic bush having an outer contour corresponding to said outer contour of said recess, said metallic bush being positioned within said recess with a central point of said hole aligned with said central axis of said permanent-magnet member; and
   a shaft pressed fitted into said hole of said metallic bush.

2. A rotor for rotary electrical machinery as set forth in claim 1 wherein said permanent-magnet member is formed into a substantially columnar shape.

3. A rotor for rotary electrical machinery as set forth in claim 1 wherein said permanent-magnet member is formed into a bottomed hollow cylindrical shape, and a boss is provided including a plurality of radially provided ribs formed integrally with said permanent-magnet member.

4. A rotor for rotary electrical machinery as set forth in claim 1 wherein the projected contour of said recess and said metallic bush on a plane orthogonally intersecting the axial line of said recess and said metallic bush is a substantially quadrangular shape.

5. A rotor for rotary electrical machinery, comprising:
   a permanent-magnet member of a cylindrical shape, said permanent-magnet member being formed of magnetic material powder and a binder resin as primary ingredients, said permanent-magnet member having a central axis and having a recess with a projected contour on a plane of said permanent-magnet member, said plane orthogonally intersecting said central axis of said permanent-magnet member, said recess having an outer contour which is non-circular in shape, said recess being provided on at least one end face of said permanent-magnet member;

a metallic bush with a central hole passing therethrough, said metallic bush having an outer contour corresponding to said outer contour of said recess, said recess having a recess axial depth which substantially corresponds to an axial depth of said metallic bush, said recess axially depth being smaller than a length of said rotor, said metallic bush being positioned within said recess with a central point of said hole aligned with said central axis of said permanent-magnet member; and a shaft pressed fitted into said hole of said metallic bush.

6. A rotor for rotary electrical machinery, comprising:

a permanent-magnet member of a cylindrical shape, said permanent-magnet member being formed of thorough magnetic material powder and a binder resin as a primary ingredients, said permanent-magnet member having a central axis and having a recess on each end of said permanent-magnet member with a projected contour on a plane of said permanent-magnet member, said plane orthogonally intersecting said central axis of said permanent-magnet member, said recess having an outer contour which is non-circular in shape, said recess being provided on at least one end face of said permanent-magnet member;

metallic bushes each with a central hole passing therethrough, each metallic bush having an outer contour corresponding to said outer contour of each said recess, each said recess having a recess axial depth which substantially corresponds to an axial depth of a corresponding said metallic bush, said recess axially depth being smaller than a length of said rotor, each said metallic bush being positioned within a corresponding said recess with a central point of said hole aligned with said central axis of said permanent-magnet member; and a shaft pressed fitted into said hole of said metallic bush.

7. A rotor for rotary electrical machinery as set forth in claim 6 wherein said permanent-magnet member is formed into a bottomed hollow cylindrical shape, and a boss is provided including a plurality of radially provided ribs formed integrally with said permanent-magnet member, said boss forming one end with one said recess.

* * * * *